UNITED STATES PATENT OFFICE 2,408,527

PROCESSES FOR REDUCING OR PREVENTING FOAM

Louis T. Monson, Alhambra, Calif., assignor to Petrolite Corporation, Ltd., Wilmington, Del., a corporation of Delaware No Drawing. Application January 1, 1944, Serial No. 516,707

7 Claims. (Cl. 252—321)

This invention relates to a process for reducing or destroying foam or inhibiting its formation, in compositions of either aqueous or non-aqueous nature.

Foams occur as undesirable, incidental features in many industrial processes. The theory of their formation is not highly developed; so that hypotheses on which foam reduction or destruction processes might be based are difficult to formulate. As a consequence, foam-destroying agents are usually devised for use in the case of particular foams and are not applicable broadly to foam problems.

I have discovered a novel process of reducing or destroying foams and of preventing their formation, which appears to be relatively general in applicability, in that it may be used on compositions comprising aqueous materials or solutions; on compositions comprising non-aqueous materials, such as hydrocarbon liquids; and on compositions comprising mixtures of aqueous and non-aqueous media. My process consists in subjecting a foaming or potentially-foaming composition to the action of a small proportion of a reagent or anti-foamer of the kind subsequently described, thereby causing the foaming properties of the liquid to be diminished, suppressed or destroyed. In applying my process to the reduction or destruction of a foam, the reagent is poured or sprayed or dripped into the body of foam on top the liquid, as desired; and the foam breaks and is destroyed or reduced, substantially at once, as a consequence of such addition of said reagent. In applying my process to the prevention of foaming, the reagent is admixed, in some predetermined small proportion, with a potentially-foaming liquid, by any desired or suitable procedure. The ability of the system to foam is destroyed or at least materially reduced by such addition of said reagent.

The reagents employed in the present process consist of basic acylated poly-aminoalcohols in which an acyloxy radical, derived from a detergent-forming acid having from 8 to 32 carbon atoms, is joined to a basic nitrogen atom by a carbon atom chain, or a carbon atom chain which is interrupted at least once by an oxygen atom. The aminoalcohols have more than one amino radical, for that matter, more than one basic amino radical. The compounds herein contemplated as anti-foamers are well known compounds and are produced by conventional procedures. Stated another way, the compounds herein contemplated are esters of aminoalcohols which contain ether linkages, as well as more than one amino nitrogen atom.

The phrase "basic amino nitrogen atom" is used in its conventional sense. ("Unsaturated groups, or negative groups, if substituted for one or more of the hydrogens of ammonia, reduce the basicity of the nitrogen atom to a remarkable degree. In general, the presence of one negative group linked on the nitrogen is sufficient to destroy the ordinary basic properties." Textbook of Organic Chemistry, Richter, second edition, page 253.)

Reference to an amine and the subsequent amino compounds is intended to include the salts and the anhydro base, as well as the hydrated base. Both the anhydro base and the hydrated base are obviously present when an aqueous system is being subjected to the reagent or when the reagent is used as a water solution or dispersion. ("In an aqueous solution of the amine, the anhydro base, R—NH₂, the hydrated base,

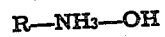

R—NH₃—OH and the two ions are all present." Richter, s. v., page 252.)

A description of certain high molal monocarboxy acids, and more particularly those commonly referred to as detergent-forming monocarboxy acids, appears in U. S. Patent No. 2,324,490. For convenience, the following description is substantially a verbatim form of the same subject-matter as it appears in said patent.

It is well known that certain monocarboxy organic acids containing eight carbon atoms or more, and not more than 32 carbon atoms, are characterized by the fact that they combine with alkali to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

I have found that the composition of matter herein described and employed as the anti-foamer of my process, is preferably derived from unsaturated fatty acids having 18 carbon atoms. Such unsaturated fatty acids include oleic acid, ricinoleic acid, linoleic acid, linolenic acid, etc. One may employ mixed fatty acids, as, for example, the fatty acids obtained from hydrolysis of cottonseed oil, soyabean oil, etc. My preferred anti-foamer is obtained from unsaturated fatty acids, and more especially, unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an olefin, with steam, or by causing a halogenated hydrocarbon to act with potassium cyanide and saponifying the product obtained. Such products or mixtures thereof, having at least 8 and not more than 32 carbon atoms and having at least one carboxyl group, or the equivalent thereof, are suitable as detergent-forming monocarboxy acids; and another analogous class equally suitable is the mixture of carboxylic acids obtained by the alkali treatment of alcohols of higher molecular weight formed in the catalytic hydrogenation of carbon monoxide.

As is well known, one need not use the high molal carboxy acid, such as a fatty acid, for introduction of the acyl group or acyloxy group. Any suitable functional equivalent such as the acyl halide, the anhydride, ester, amide, etc., may be employed.

The anti-foaming agent employed in the present process consists of a basic poly-aminoalcohol ester, as described. Aminoalcohol esters of the kind herein contemplated are described in U. S. Patent No. 2,259,704, dated October 21, 1941, to Monson and Anderson.

In light of what has been said, it hardly appears necessary to include a list of reactants and reagents derivable therefrom. Since the basic poly-aminoalcohol from which my reagents are derived by the replacement of one hydroxyl hydrogen atom with the acyl radical of a monocarboxy detergent-forming acid is essentially a polymerized triethanolamine, triethanolamine itself is commonly the amino raw material employed. However, if desired, polymerized triethanolamine may be first prepared and later subjected to the acylation step. In the first instance, polymerization of the triethanolamine proceeds simultaneously with acylation. In the second instance, the two operations are conducted separately. Triethanolamine is readily polymerized, simply by heating, although it may be preferred, in some instances, to conduct the polymerization in the presence of suitable catalysts, such as minor proportions of sodium hydroxide or iron.

Some of the acylated amino bodies contemplated for use in my process are freely dispersible in water in the free state. Presumably, such systems comprise the reagent in the form of a base, i. e., a substituted ammonium compound. In other instances, the free forms of the reagents are substantially water-insoluble, but the salt forms (e. g., the acetates) are very water-dispersible.

In some such instances, therefore, it is very much more desirable to employ the reagent in the form of one of its salts. I have found, for example, that the acetate, hydroxyacetate, lactate, gluconate, propionate, caprate, phthalate, fumarate, maleate, benzoate, succinate, oxalate, tartrate, chloride, nitrate, or sulfate, prepared by addition of the suitable acid to the acylated amino body, constitutes a reagent which is usually somewhat more soluble or dispersible in water than the original acylated amino body, and which is, if anything, slightly more effective than the simple acylated amino body, when used in my process. In such instances where the simple acylated amino body is not particularly water-dispersible, it may still be possible to employ it in free form and without preparing a salt form, by using some non-aqueous solvent, such as aromatic petroleum solvent, instead of water. It is to be understood that references to the reagents in these specifications and claims include the amino bodies in basic form and in the form of salts of acids, as well as the amino bodies themselves.

As an example of a preferred type of reagent which is effective for use in my process, the following is submitted: I prepare a mixture of di-amino and triamino materials which correspond essentially to either one of the two following type formulas:

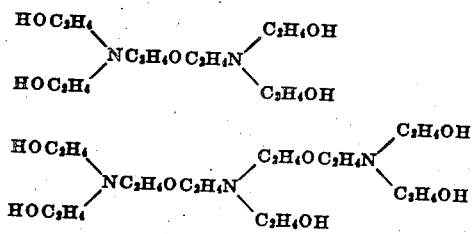

As stated above, triethanolamine may be polymerized to produce the polyaminoalcohol which is subsequently to be acylated. It is apparent from an inspection of the above formulas that they represent dimeric and trimeric polymerized forms of triethanolamine. It has also been stated above that triethanolamine may be polymerized simply by heating. After determining the average molecular weight of such mixture, I combine the same with castor oil in the proportion of 1 pound mole of castor oil for 3 pound moles of the mixed amines, "pound mole" in the latter case being calculated on the average molecular weight as determined. Such mixture is heated to approximately 160–260° C. for approximately 6 to 25 hours, until reaction is complete, as indicated by the disappearance of all of the triricinolein present in the castor oil. If triethanolamine itself is employed as the amino raw material, as it is stated above that it may be, it is evident that, instead of proceeding as just stated, the final acylated product is obtained by heating together one pound mole of castor oil and either 6 or 9 pound moles of triethanolamine, depending on whether it is desired to produce an acylated derivative of the aminoalcohol shown in the first or the second formula above. The finished product may be used as such, but because of its appreciable viscosity, it may be desirable to mix it with any desired proportion of water or other solvent. I have found, for example, that a mixture of 20 parts of the above reagent and 80 parts of water has physical properties which are in some respects superior to those of the concentrated material.

As stated above, the material may be employed in the concentrated form, or it may be diluted with a suitable solvent. I have frequently found water to constitute a satisfactory solvent, because of its availability and negligible cost; but in some cases I have used non-aqueous solvents, such as aromatic petroleum solvent, in preparing reagents which were effective when used for the purpose of reducing or destroying foams or preventing their formation. Depending on the choice of acylated amino body and its molecular weight, the solubility may be expected to range from ready water-solubility in the free state to substantial water-insolubility. As stated above, the salts, and specifically the acetates, generally show improved water-solubility over the simple acylated amino bodies; and I have in some cases obtained the best results by using salt forms of the acylated amino bodies which possess appreciable water-solubility. Because such reagents are commonly effective in proportions of the order of 10 to 50 parts per million, their solubility in the foaming, or potentially foaming, composition may be entirely different from their apparent solubility in bulk, in either water or oil. Undoubtedly, they have some solubility in both media, within the concentration range employed.

I desire to point out that the superiority of the reagent contemplated in my process is based upon its ability to reduce or destroy foam, or to prevent foam formation, in certain foaming or potentially foaming compositions more advantageously and at lower cost than is possible with other reagents or processes. In certain instances, it has been found to destroy or reduce foams or prevent their formation, which foams were not economically or effectively reducible or preventable by any other known means.

In one application of my process, an aqueous composition comprising an alkaline hypochlorite bleaching solution produced such a copious foam during manufacture that the latter interfered with the handling of the solution. Addition of as little as 25 ml. of a reagent comprising a material of the kind above recited was sufficient to destroy or reduce the head of foam on 8,000 gallons of the liquid. The proportion of reagent to foaming liquid approximated 1 to 1,200,000.

In a second application of my process, a 1,000 barrel tank of petroleum hydrocarbon distillate, known as Diesel fuel, had become contaminated in some manner in the refinery, to such extent that it was impossible to load it into tank trucks without having the foam come out of the filling hatch when the truck was only partially loaded. Introducing 10 gallons of a reagent comprising the material herein described resulted in the production of a Diesel fuel which was loaded expeditiously into said tank trucks, without any foaming difficulty. The ratio of reagent to foaming system here was approximately 1 to 4,000.

In a third instance, 800,000 gallons of copper ammonium acetate solution, employed in the purification of butadiene in synthetic rubber manufacture, had become so contaminated, in an unknown manner, that the gas recovery process could not be operated. The solution foamed out the top of the tower when heat was applied to recover the respective dissolved hydrocarbon gases. In this instance, use of 1 part of a reagent comprising a material of the kind above described, to 80,000 parts of the copper solution, produced immediate and complete reduction and destruction of the foam, and served effectively to prevent its regeneration.

While the above described reagents are remarkably effective for destroying or reducing a preventing foams, I have additionally discove that their effectiveness is sometimes somewl enhanced by admixing with them varying p portions of other materials. For example, in i case of the Diesel fuel foam problem referred above, a mixture of approximately equal p portions of my reagent and sulfonated castor was also found to be effective in reducing 1 foaming propensity of the hydrocarbon mater In the case of the copper absorbent solution ferred to above, the use of equal parts of my agent and drastically oxidized castor oil v found to be effective.

In operating the process of my invention, ( may add the anti-foaming reagent to the co position having foaming tendencies before foa ing occurs, in which case the reagent opera to prevent progressive foam formation; or 1 reagent may be added to the foaming liquid, which case it acts to destroy or reduce the fo already present. The reagent may be added 1 diluted, or diluted by water or some suita non-aqueous solvent, such as petroleum dist lates, etc. In the case of a foaming liquid, it n be most desirable to make a solution or dispers of my reagent, and spray or sprinkle such so tion or dispersion over the head of foam prese If sufficient turbulence exists in the vessel cc taining the foaming liquid, it may suffice mer to add the undiluted reagent to the system one operation and at one time. In the case foam prevention, addition of the reagent to 1 liquid system may be by any suitable means a injection may be continuous or intermittent, required. A proportioning pump may be used inject the reagent into the composition, if ( sired. In all cases, the proportion of my reag required to effect foam destruction or reducti or foam prevention, is only a very small fract of the volume of liquid present in the foaming potentially foaming composition.

The effectiveness of my reagent resides in p in the use of proper proportions thereof. I correct amounts to be employed may readily determined by subjecting any desirable test v umes of the foaming, or potentially foami composition to accurately measured small v umes of the reagent, and observing the resu of such additions, especially after shaking. F shaking the container and contents will give 1 added information as to whether the anti-foan will prevent or suppress foaming over a peri of time. If the proportions of reagent to be e ployed are very small, it may be desirable determine the optimum proportions of foami liquid and anti-foamer by introducing the lat into the sample in the test container, in the fo of a solution in a suitable solvent. Such pro dure, which increases the accuracy of the ad tion, requires that a companion test be conduct using an equal volume of solvent, to prove tl the effect observed is due to the anti-foamer a not to the solvent in which it was added.

In summary, attention is directed to the fa that the amino compounds herein contemplat are polyamino in type. They have free hydro: radicals present. There must be present one ( currence of the radical RCO which is the a radical of a monocarboxy detergent-forming a having at least 8 and not more than 32 carb atoms, and the amino nitrogen atoms must basic, i. e., free from direct linkage with an u saturated or negative radical such as an a radical or an aryl radical.

Throughout this specification I have shown that my process is equally applicable to systems in which a foam is already in existence and to systems which are potentially foaming compositions, in that they have the property of producing foams when agitated or mixed with air or some other suitable gas. In the claims appended hereto I have mentioned only the destruction or reduction of foams, on the understanding that destruction, reduction and prevention are substantially identical, it being impossible to determine in the prevention process whether the reagent does, in fact, prevent the formation of the initial laminae of foam, or whether such initial laminae are destroyed by the reagent before subsequent laminae of sufficient stability to produce a foam can be superimposed thereon. By "foaming composition" in such claims, I mean a composition which is either actually foaming, or which is capable of producing a foam under suitable conditions.

In most instances, my reagent is effective to the extent that it destroys an existing foam substantially completely. In some instances, such, for example, as when the proportions of liquid and anti-foamer are quite widely removed from optimum proportions, the foam reduction may be slow, or it may even be incomplete. I intend that this description and my invention relate both to complete destruction and to partial reduction of foams.

The proportions of reagent required to be used appear, as shown by the foregoing examples, to vary widely. However, I wish to limit my invention to the use of amounts of anti-foamer comprising 1% or less of the foaming system. Usually, the amounts required will be between 0.1% and 0.0001%.

Having thus described my invention, what I claim as new and desire to secure by Letters Patent is:

1. A process for destroying or reducing foam, characterized by subjecting a foaming composition to the action of a reagent comprising a basic acylated polyaminoalcohol; said acylated polyaminoalcohol being a member of the class consisting of

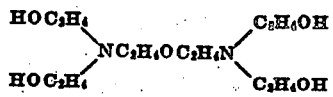

and

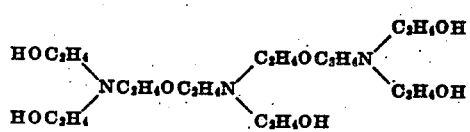

in which one hydroxyl hydrogen atom has been replaced by RCO, the acyl radical of a monocarboxy detergent-forming acid having at least 8 and not more than 32 carbon atoms; said amino compound being selected from the class consisting of the anhydro base, the hydrated base, and salts; said amino compound being selected from the class consisting of the anhydro base, the hydrated base, and salts.

2. A process for destroying or reducing foam, characterized by subjecting a foaming composition to the action of a reagent comprising a basic acylated polyaminoalcohol; said acylated polyaminoalcohol being a member of the class consisting of

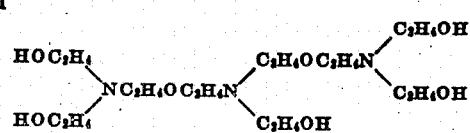

and

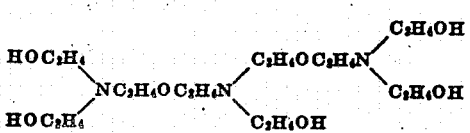

in which one hydroxyl hydrogen atom has been replaced by RCO, the acyl radical of a higher fatty acid; said amino compound being selected from the class consisting of the anhydro base, the hydrated base, and salts.

3. A process for destroying or reducing foam, characterized by subjecting a foaming composition to the action of a reagent comprising a basic acylated polyaminoalcohol; said acylated polyaminoalcohol being a member of the class consisting of

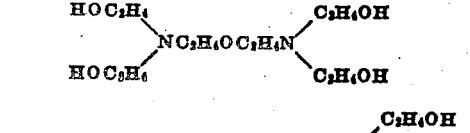

and

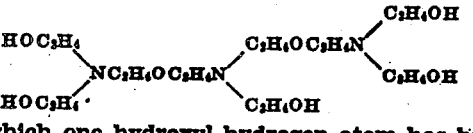

in which one hydroxyl hydrogen atom has been replaced by RCO, the acyl radical of a higher fatty acid having 18 carbon atoms; said amino compound being selected from the class consisting of the anhydro base, the hydrated base, and salts.

4. A process for destroying or reducing foam, characterized by subjecting a foaming composition to the action of a reagent comprising a basic acylated polyaminoalcohol; said acylated polyaminoalcohol being a member of the class consisting of

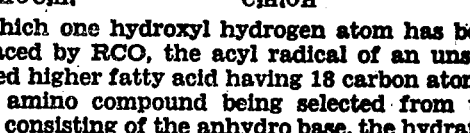

and

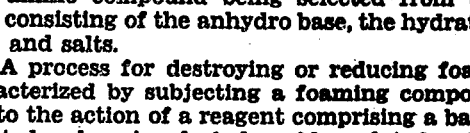

in which one hydroxyl hydrogen atom has been replaced by RCO, the acyl radical of an unsaturated higher fatty acid having 18 carbon atoms; said amino compound being selected from the class consisting of the anhydro base, the hydrated base, and salts.

5. A process for destroying or reducing foam, characterized by subjecting a foaming composition to the action of a reagent comprising a basic acylated polyaminoalcohol; said acylated polyaminoalcohol being a member of the class consisting of

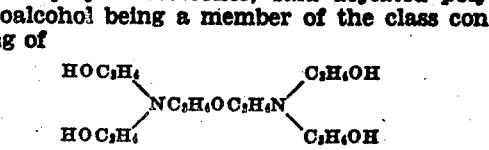

and

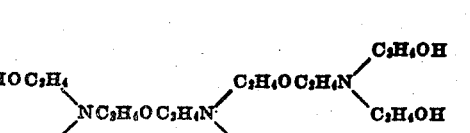

in which one hydroxyl hydrogen atom has been replaced by the oleyl radical; said amino compound being selected from the class consisting of the anhydro base, the hydrated base, and salts.

6. A process for destroying or reducing foam, characterized by subjecting a foaming composition to the action of a reagent comprising a basic acylated polyaminoalcohol; said acylated polyaminoalcohol being a member of the class consisting of

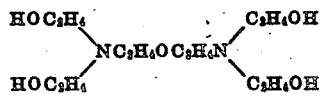

and

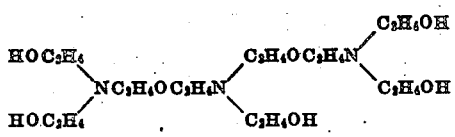

in which one hydroxyl hydrogen atom has been replaced by the ricinoleyl radical; said amino compound being selected from the class consisting of the anhydro base, the hydrated base, and salts.

7. A process for destroying or reducing foam characterized by subjecting a foaming composition to the action of a reagent comprising a basic acylated polyaminoalcohol; said acylated polyaminoalcohol being a member of the class consisting of

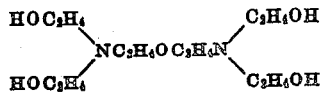

and

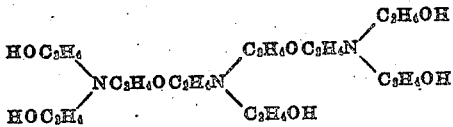

in which one hydroxyl hydrogen atom has been replaced by the linoleyl radical; said amino compound being selected from the class consisting the anhydro base, the hydrated base, and salts.

LOUIS T. MONSON